United States Patent
Krückel et al.

(10) Patent No.: US 9,422,670 B2
(45) Date of Patent: Aug. 23, 2016

(54) AQUEOUS STARCH CONTAINING POLYMER DISPERSION FOR PAPER APPLICATIONS

(75) Inventors: Ralf Krückel, Langerwehe (DE); Martin Werner, Wegberg (DE)

(73) Assignee: Kemira Oyj, Helsinki (FI)

( * ) Notice: Subject to any disclaimer, the term of this patent is extended or adjusted under 35 U.S.C. 154(b) by 367 days.

(21) Appl. No.: 13/994,002

(22) PCT Filed: Dec. 12, 2011

(86) PCT No.: PCT/EP2011/072395
§ 371 (c)(1),
(2), (4) Date: Jun. 13, 2013

(87) PCT Pub. No.: WO2012/080145
PCT Pub. Date: Jun. 21, 2012

(65) Prior Publication Data
US 2013/0267632 A1    Oct. 10, 2013

Related U.S. Application Data

(60) Provisional application No. 61/423,194, filed on Dec. 15, 2010.

(30) Foreign Application Priority Data

Dec. 15, 2010  (EP) .................................... 10195164

(51) Int. Cl.
| | | |
|---|---|---|
| *D21H 17/29* | (2006.01) | |
| *D21H 19/20* | (2006.01) | |
| *C08F 212/08* | (2006.01) | |
| *D21H 17/35* | (2006.01) | |
| *D21H 17/37* | (2006.01) | |
| *D21H 19/34* | (2006.01) | |
| *D21H 21/16* | (2006.01) | |
| *C08F 251/00* | (2006.01) | |
| *C08F 220/18* | (2006.01) | |

(52) U.S. Cl.
CPC .............. *D21H 19/20* (2013.01); *C08F 212/08* (2013.01); *C08F 251/00* (2013.01); *D21H 17/29* (2013.01); *D21H 17/35* (2013.01); *D21H 17/37* (2013.01); *D21H 19/34* (2013.01); *D21H 21/16* (2013.01); *C08F 2220/1825* (2013.01)

(58) Field of Classification Search
CPC ....... D21H 19/20; D21H 17/37; D21H 17/35; D21H 17/34; D21H 17/29; C08F 2/44; C08F 251/00; C08F 2220/1825; C08F 212/08
See application file for complete search history.

(56) References Cited

U.S. PATENT DOCUMENTS

| | | | |
|---|---|---|---|
| 5,672,392 | A | 9/1997 | De Clercq et al. |
| 6,426,381 | B1 | 7/2002 | Konig et al. |
| 6,835,767 | B2 | 12/2004 | Kuhn et al. |
| 7,579,414 | B2 | 8/2009 | Kukula et al. |
| 2002/0040088 | A1 | 4/2002 | Hauschel et al. |
| 2009/0139675 | A1 | 6/2009 | Stein et al. |
| 2009/0178773 | A1 | 7/2009 | Brockmeyer et al. |
| 2010/0016478 | A1 | 1/2010 | Brockmeyer et al. |
| 2010/0069597 | A1 | 3/2010 | Venkatesh et al. |
| 2010/0236736 | A1 | 9/2010 | Brockmeyer et al. |
| 2010/0324178 | A1 | 12/2010 | Brockmeyer et al. |

FOREIGN PATENT DOCUMENTS

| | | |
|---|---|---|
| JP | 58-115196 A | 7/1983 |
| JP | 2009-500461 A | 1/2009 |
| WO | WO 99/42490 A1 | 8/1999 |
| WO | WO2007/000042 A1 | 1/2007 |
| WO | WO 2007/147726 A1 | 12/2007 |
| WO | WO 2008/055858 A2 | 5/2008 |
| WO | WO 2008/071688 A1 | 6/2008 |

OTHER PUBLICATIONS

Japanese Office Action dated May 7, 2014 for related Application No. 2013-543673.
English translation of Japanese Office Action dated May 7, 2014 for related Application No. 2013-543673.
European Search Report dated Apr. 1, 2011 for EP Application No. 10195164.8.
International Search Report dated Jan. 26, 2012 for PCT Application No. PCT/EP2011/072395.
English language translation of Japanese Laid-Open No. 1983-115196 (JP58-115196A); laid open date Jul. 8, 1983.

*Primary Examiner* — Peter D Mulcahy
(74) *Attorney, Agent, or Firm* — Berggren Inc.

(57) ABSTRACT

The invention concerns an aqueous starch-containing polymer dispersion obtainable by co-polymerization of ethylenically unsaturated monomers comprising: (a) from 20 to 50 wt % of at least one of styrene or substituted styrene; (b) from 20 to 60 wt % t-butyl (meth)acrylate; and, (c) from 0 to 20 wt % of at least one ethylenically unsaturated co-polymerizable monomer being different from (a) and (b), in the presence of (d) from 10 to 50 wt % cationic starch, wherein the sum of (a)+(b)+(c)+(d) is 100%. The invention further concerns preparation and use thereof.

12 Claims, No Drawings

AQUEOUS STARCH CONTAINING POLYMER DISPERSION FOR PAPER APPLICATIONS

This application is a national stage filing under 35 U.S.C. §371 of PCT/EP2011/072395, filed Dec. 12, 2011, which claims priority to European Patent Application No. 10195164.8, filed Dec. 15, 2010, and U.S. Provisional Patent Application No. 61/423,194, filed on Dec. 15, 2010, the contents of which are incorporated herein by reference in their entirety.

The invention relates to an aqueous starch containing polymer dispersion, its preparation and use.

Aqueous starch containing styrene-acrylate polymer dispersions are widely used for surface sizing of paper. Such dispersions are described in e.g. U.S. Pat. Nos. 6,426,381, 5,672,392 and 6,835,767, and in US Patent Applications Publ. No. 2009/0139675 and 2010/0016478.

For demanding paper grades, such as recycled fibre based paper and board, starch free cationic styrene-acrylate dispersions are normally used as they usually are considered to be most efficient. However, they are more complicated to produce and may contain relatively high amounts of VOC (solvent from the emulsifier preparation). Such dispersions are described in e.g. U.S. Pat. No. 7,579,414 and US Patent Applications Publ. No. 2002/0040088.

It is an object of the invention to provide a starch containing polymer styrene-acrylate based polymer dispersion with high efficiency for surface sizing of paper, particularly paper made from recycled paper.

It has been found that this object can be met with an aqueous starch-containing polymer dispersion obtainable by co-polymerisation of ethylenically unsaturated monomers comprising:

(a) from 20 to 50 wt % of at least one of styrene or substituted styrene;
(b) from 20 to 60 wt % t-butyl (meth)acrylate; and,
(c) from 0 to 20 wt % of at least one ethylenically unsaturated co-polymerisable monomer being different from (a) and (b), in the presence of
(d) from 10 to 50 wt % cationic starch,
wherein the sum of (a)+(b)+(c)+(d) is 100%.

The term (meth)acryl as used herein refers to both acryl and methacryl equally. For example, (meth)acrylate refers to any of acrylate or methacrylate while (meth)acrylic acid refers to any of acrylic or methacrylic acid.

In some embodiments the amount of at least one of styrene or substituted styrene is from 25 to 45 wt % or from 29 to 41 wt %. Examples of substituted styrene that may be used include styrenes halogenated from the ring, such as chlorostyrene, and $C_1$ to $C_4$ substituted styrenes, such as vinyltoluene and alpha-methylstyrene.

In some embodiments the amount of t-butyl (meth)acrylate is from 24 to 40 wt % or from 24 to 38 wt %.

The monomer (c), if present, is at least one monomer not falling under the definitions of (a) or (b), i.e. not being any of styrene, substituted styrene or t-butyl (meth)acrylate. The monomer (c) may be a single kind of monomer or a combination of two, three or further different kinds of monomers. In some embodiments the amount of monomer (c) is from 0 to 15 wt %, from 0 to 10 wt %, from 0 to 5 wt % or even 0 wt %. In some embodiments the weight ratio of monomer (c) to monomer (b) is from 0:1 to 0.1:1. Examples of monomer (c), if present, include at least one of alkyl (meth)acrylates, (meth) acrylonitrile, (meth)acrylamides, vinyl esters and anionic monomers such as (meth)acrylic acid.

Examples of alkyl (meth)acrylates include at least one ester of (meth)acrylic acid derived from monohydric $C_1$ to $C_{22}$ alcohols, such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, n-pentyl acrylate, n-pentyl methacrylate, neopentyl acrylate, neopentyl methacrylate, cyclohexyl acrylate, cyclohexyl methacrylate, 2-hexyl acrylate, 2-hexyl methacrylate, 2-ethylhexyl acrylate, 2-ethylhexyl methacrylate, n-octyl acrylate, n-octyl methacrylate, isooctyl acrylate, isooctyl methacrylate, decyl acrylate and decyl methacrylate, dodecyl acrylate, dodecyl methacrylate, stearyl acrylate and stearyl methacrylate.

Further examples of monomers include dialkylaminoalkyl (meth)acrylamides, dimethylaminoethyl methacrylate, diethylaminoethyl acrylate, diethylaminoethyl methacrylate, dimethylaminopropyl acrylate, dimethylaminopropyl methacrylate, vinyl acetate, vinyl propionate, N-vinylformamide, acrylamide, methacrylamide, N-vinylpyrrolidone, N-vinylimidazole, N-vinylcaprolactam, acrylic acid, methacrylic acid, acrylamido methylpropane sulfonic acid, vinylsulfonic acid, styrenesulfonic acid and salts of the monomers comprising acid groups.

Acidic monomers may be used in partly or completely neutralized form. Useful neutralising agents include, for example, sodium hydroxide solution, potassium hydroxide solution, sodium carbonate, sodium bicarbonate, calcium hydroxide and ammonia. Basic monomers can be used in the polymerisation in the form of the free bases, as salts with organic acids or mineral acids, or in quaternized form.

In some embodiments the amount of cationic starch is from 15 to 45 wt % or from 20 to 40 wt %.

The cationic starch may, for example, be such that has been prepared by reacting natural starch with at least one quaternizing agent such as 2,3-epoxypropyltrimethylammonium chloride. The number of cationic groups which are contained in the starch on average per glucose unit in the cationised starch is expressed by the degree of substitution (DS), which, for example, may be from 0.001 to 1.0 or from 0.005 to 0.5, particularly from 0.01 to 0.1. Examples of natural starches that may be cationised include, for example, any of potato, wheat, corn, rice, tapioca, mandioca, waxy maize and sorghum starch. The starch may have a high content of amylopectin, for example at least 75 wt % or at least 85 wt %. The cationised starches can be further modified, for example by one or more of etherification, esterification, crosslinking or hydrophobation. Cationic starch is also commercially available, for example under the trademarks Emcat C 15™ or Emcat F-7889™ from Emsland Stärke, Hi-Cat 135™ or Hi-Cat SP™ from Roquette, Solbond C 40™ or Solbond C 50™ from Solam, or Amylofax 75™, Amylofax HS™ or Amylofax PW™ from Avebe.

In some embodiments the cationic starch has a weight average molecular weight $M_w$ from 1000 to 65000, for example from 5000 to 50000 or from 11000 to 35000. Such a molecular weight can be obtained by degrading cationic starch of a higher molecular weight, for example by one or more of oxidative, acidic, thermal or enzymatic treatment, if appropriate shortly before the beginning of polymerisation or in a separate step. Oxidizing agents, such as hypochlorite, peroxodisulphate or hydrogen peroxide, or combinations thereof, optionally in combination with metal salts such as iron salts, may be used for the degradation alone or in succession to obtain a desired molecular weight of the starch. It is possible to use a single degraded cationized starch or mixtures of two or more degraded cationic starches in the polymerisation. The molecular weight $M_w$ may be determined by standard methods known to the person skilled in the art, for example by means of gel permeation chromatography using a multi-angle scattered light detector (SEC-MALS).

In some embodiments the dry content of the dispersion is from 5 to 50 wt %, particularly from 10 to 40 wt % or from 15 to 40 wt %. The term dry content as used herein refers to the content of anything in the composition not being water.

In some embodiments the mean particle diameter in the polymer dispersions is from 20 to 500 nm, particularly from 20 to 250 nm or from 50 to 100 nm. The mean particle diameter can be determined by means of methods known in the art, such as, for example, laser correlation spectroscopy, ultracentrifuging or HDF (hydrodynamic fractionation).

In some embodiments the polymer dispersion of the invention is obtainable by co-polymerisation of monomers comprising:
(a) from 25 to 45 wt % styrene;
(b) from 24 to 40 wt % t-butyl (meth)acrylate; and,
(c) from 0 to 10 wt % of at least one ethylenically unsaturated co-polymerisable monomer being different from (a) and (b), in the presence of
(d) from 15 to 45 wt % cationic starch,
wherein the sum of (a)+(b)+(c)+(d) is 100%.

In some embodiments the polymer dispersion of the invention is obtainable by co-polymerisation of monomers comprising:
(a) from 29 to 41 wt % styrene;
(b) from 24 to 38 wt % t-butyl (meth)acrylate; and,
(c) from 0 to 10 wt % of at least one ethylenically unsaturated co-polymerisable monomer being different from (a) and (b), in the presence of
(d) from 20 to 40 wt % cationic starch,
wherein the sum of (a)+(b)+(c)+(d) is 100%.

A further aspect of the invention concerns a process for the production of a polymer dispersion as described above, comprising polymerising the ethylenically unsaturated monomers (a)-(c) in the presence of the cationic starch in amounts as specified above.

Conventional free-radical emulsion polymerisation in an aqueous medium may be used. In order to initiate the polymerisation a redox initiator may be used. Examples of redox initiators include graft-linking water-soluble redox systems, for example comprising hydrogen peroxide and a heavy metal salt or comprising hydrogen peroxide and sulfur dioxide or comprising hydrogen peroxide and sodium metabisulfite. Further possible redox systems include combinations of tert-butyl hydroperoxide and/or sulfur dioxide, sodium or potassium persulfate/sodium bisulfite, ammonium persulfate/sodium bisulfite or ammonium persulfate/iron(II) sulfate. More specific examples include hydrogen peroxide in combination with a heavy metal salt, such as iron(II) salts like iron(II) sulfate. A redox system may additionally comprise a further reducing agent, such as ascorbic acid, sodium formaldehyde sulfoxylate, sodium disulfite and/or sodium dithionite. The redox initiators may, for example, be used in an amount of from 0.05 to 10 wt % or from 0.1 to 7 wt %, based on the monomers.

An aqueous solution of a degraded cationic starch and of a heavy metal salt can initially be provided and the monomers can be metered continuously, discontinuously or batchwise, either separately or as a mixture. A polymerisation initiator may be simultaneously metered together with or separately from the monomers. In the case a redox system is used as initiator the reducing part thereof, e.g. a heavy metal salt, may be added before the polymerisation while the oxidising part thereof, e.g. hydrogen peroxide, may be metered simultaneously with the monomers. A step or gradient procedure can also be used for the preparation of the starch-containing polymer dispersions, in which case the addition can be effected uniformly or non-uniformly over the metering period, i.e. with changing metering rate.

The polymerisation may be carried out at any suitable temperature, for example from 30 to 110° C. or from 50 to 100° C. The reaction times may, for example, be from 0.5 to 10 hours or from 0.75 to 4 hours. The use of a pressure reactor or carrying out a continuous polymerisation in a stirred vessel cascade or flow tube is also possible.

The polymerisation may be carried out in the absence of oxygen, for example in an inert gas atmosphere such as under nitrogen. During the polymerisation, thorough mixing of the components is usually beneficial and the reaction mixture may be stirred during the entire duration of the polymerisation and any subsequent post-polymerisation.

In order to increase the dispersing effect, conventional ionic, nonionic or amphoteric emulsifiers can be added to the polymerisation batch, for example in an amount from 0 to 3 wt % or 0.02 to 2 wt % based on the sum of the monomers. Examples of conventional emulsifiers include reaction products of long-chain monohydric alcohols ($C_{10}$ to $C_{22}$ alkanols) with from 4 to 50 mol of ethylene oxide and/or propylene oxide per mole of alcohol or ethoxylated phenols or alkoxylated alcohols esterified with sulfuric acid which are generally used in a form neutralized with alkali. Further conventional emulsifiers include, for example, sodium alkanesulfonates, sodium alkylsulfates, sodium dodecylbenzenesulfonate, sulfosuccinic esters, quaternary alkylammonium salts, alkylbenzylammonium salts, such as dimethyl-$C_{12}$- to $C_{18}$-alkylbenzylammonium chlorides, primary, secondary and tertiary fatty amine salts, quaternary amidoamine compounds, alkylpyridiniumsalts, alkylimidazolinium salts and alkyloxazolinium salts. However, the sizing performance of the resulting polymer dispersion is normally improved if no emulsifier is added to the polymerisation batch.

The polymerisation can, if appropriate, also be carried out in the presence of conventional regulators. In principle, all known regulators which reduce the molecular weight of the polymers forming can be used such as sulfur containing organic compounds, for example mercaptans, di- and polysulfides, esters and sulfides of thio- and dithiocarboxylic acids and enol sulfides. Halogen compounds, aldehydes, ketones, formic acid, enol ethers, enamines, hydroxylamine, halogenated hydrocarbons, alcohols, ethylbenzene and xylene may also be used.

Examples of regulators based on sulfur containing organic compounds include mercaptoethanol, mercaptopropanol, mercaptobutanol, thioglycolic acid, thioacetic acid, thiopropionic acid, 1-dodecanthiol, thioethanolamine, sodium dimethyidithiocarbamate, cysteine, ethyl thioglycolate, trimethylolpropane trithioglycolate, pentaerythrityl tetra (mercaptopropionate), pentaerythrityl tetrathioglycolate, trimethylolpropane tri(mercaptoacetate), butyl methylenebisthioglycolate, thioglycerol, glyceryl monothioglycolate, n-octadecyl mercaptan, n-dodecyl mercaptan, tert-dodecyl mercaptan, butyl mercaptan, thiophenol, mercaptotrimethoxysilane and acetylcysteine.

Examples of halogen compounds useful as regulators include trichloromethane, tetrachloromethane and bromotrichloromethane, aldehydes, such as acetaldehyde, propionaldehyde, crotonaldehyde and butyraldehyde, alcohols, such as n-propanol and isopropanol and buten-3-ol and allyl alcohol. Further examples of regulators include vitamin A acetate, vitamin A palmitate, geranial, neral, geraniol, geranyl acetate, limonene, linalyl acetate, terpinolene, γ-terpinene, α-terpinene, R(−)-α-phellandrene, terpineol, resorcinol, hydroquinone, pyrocatechol, phloroglucine and diphenylethylene.

The amount of regulator may, for example, be from 0 to 5 or from 0.1 to 2 wt % based on the total amount of monomers (a)-(c).

The polymerisation may be carried out at any suitable pH, for example from 2 to 9 or from 3 to 5.5. The pH can be adjusted to the desired value before or during the polymerisation using conventional acids, such as hydrochloric acid, sulfuric acid or acetic acid, or using bases, such as sodium hydroxide solution, potassium hydroxide solution, ammonia, ammonium carbonate, etc. After the end of the polymerisation the dispersion may be adjusted to a suitable pH, for example from 5 to 7, with any appropriate alkaline substance such as sodium hydroxide solution, potassium hydroxide solution or ammonia.

Residual monomers may be removed from the starch-containing polymer dispersion by any appropriate means such as post-polymerisation. For example, an initiator such as hydrogen peroxide and/or any other, peroxide or hydroperoxides and/or any azo initiator may be added to the polymer dispersion after the end of the main polymerisation. The combination of the initiators with suitable reducing agents, such as, for example, ascorbic acid or sodium bisulfite, is also possible. Oil-soluble initiators which are sparingly soluble in water may be used, for example conventional organic peroxides, such as dibenzoyl peroxide, di-tert-butyl peroxide, tert-butyl hydroperoxide, cumyl hydroperoxide or biscyclohexyl peroxydicarbonate. For the post-polymerisation, the reaction mixture may be heated, for example, to a temperature corresponding to the temperature at which the main polymerisation was carried out or up to 20° C. or up to 10° C. higher, for example within the range 35 to 100° C. or from 45 to 95° C. The main polymerisation may be considered as complete when the polymerisation initiator has been consumed or the monomer conversion is, for example, at least 98% or at least 99.5%.

After the end of the polymerisation, a complexing agent for heavy metal ions can be added to the polymer dispersion in an amount such that all heavy metal ions that may have been used are bound in complexed form. Examples of complexing agents include ethylenediaminetetraacetic acid, nitrilotriacetic acid, diethylenetriaminepentaacetic acid, polyaspartic acid, iminodisuccinic acid, citric acid and salts thereof. At least one complexing agent may, for example, be used in concentrations from 1 to 10 moles or from 1.1 to 5 moles per mole of heavy metal ion.

The invention further concerns use of a dispersion according to the invention as described above for surface treatment of paper. The invention also concerns a process for the production of paper comprising the steps of forming a paper web from a stock containing cellulosic fibres and applying to at least one surface of the paper web an aqueous dispersion as described above. Finally, the invention concerns a process for surface sizing of paper comprising applying a polymer dispersion as described above to at least one surface of the paper.

The dispersion may be applied to the paper web by any method suitable for surface sizing, such in a size press, film press, speedsizer or gate-roll, and may for example be included in the size press liquor. The amount of dispersion added to the size press liquor may, for example, be from 0.05 to 5% by weight, based on dry substance, and depends on the desired degree of sizing of the papers to be finished. Furthermore, the size press liquor may comprise further substances, such as, for example, starch, pigments (e.g. chalk, precipitated calcium carbonate, kaolin, titanium dioxide, barium sulphate or gypsum), optical brighteners, biocides, strength agents for paper, fixing agents, antifoams, retention aids, crosslinkers (e.g. zirconium compounds), insolubilisers, defoamers, and/or drainage aids. The amounts of dry polymer applied to the surface of paper web may, for example, be from 0.005 to 1.0 g/m$^2$ or from 0.01 to 0.5 g/m$^2$.

The term "paper", as used herein, is meant to include not only ordinary paper but all types of cellulose-based products in sheet or web form, including, for example, board and paper-board. The invention is particularly advantageous for surface treatment of paper fully or partly based on recycled paper. Examples of such paper include paper and board used for packaging such as liner, liner board, container board, testliner, recycled liner such as OCC, or white top liner having a back layer made from recycled fibers.

The invention is further illustrated by means of the following non-limiting examples. Parts and percentages relate to parts by weight respectively percent by weight, unless otherwise stated.

EXAMPLE 1

Six polymer dispersions A through F were prepared by polymerising styrene and either n-butylacrylate or t-butylacrylate in the presence of cationic potato starch (DS of about 0.035) that had been degraded by treatment with hydrogen peroxide in sulfuric acid to a molecular weight $M_w$ of around 15000-20000 in amounts according to Table 1. 400 g aqueous starch solution (dry content 12.6 wt %) was added to a Lab-Max reactor with a 6-necked lid equipped with a stirrer, thermometer and condenser. The starch solution was heated to 65° C., the stirring rate was set to 450 rpm and 5 ml of a 4.022 mg/ml solution of Mohr's salt (ammonium iron(II) sulfate) was added. 12.681 g of 35 wt % aqueous hydrogen peroxide solution and 90.5 g of a monomer mixture with 0.36 wt % 1-dodecanthiol were slowly charged to the reaction over a period of 3 hours. The reactor temperature was 65° C. during the first hour and was raised to 68° C. for the last two hours. After the dosing was completed, the reaction was kept at 68° C. for 1.5 hours and then cooled down to 40-50° C. The obtained product was collected from the reactor and allowed to cool to room temperature before adjusting the pH to 3.6 with 25 wt % NaOH. The dry content of the final product was around 28 wt %.

TABLE 1

| Formulation | Product composition |
| --- | --- |
| A (comparative) | 40% Styrene |
| | 24% n-Butylacrylate |
| | 36% Cationic starch (dry) |
| B (comparative) | 28% Styrene |
| | 36% n-Butylacrylate |
| | 36% Cationic starch (dry) |
| C (invention) | 40% Styrene |
| | 24% t-Butylacrylate |
| | 36% Cationic starch (dry) |
| D (invention) | 28% Styrene |
| | 36% t-Butylacrylate |
| | 36% Cationic starch (dry) |
| E (comparative) | 34% Styrene |
| | 30% n-Butylacrylate |
| | 36% Cationic starch (dry) |
| F (invention) | 34% Styrene |
| | 30% t-Butylacrylate |
| | 36% Cationic starch (dry) |

EXAMPLE 2

The sizing effect of formulations A through D was tested as described below on a test paper being a unsized testliner grade from mixed waste, having a basis weight of 140 g/m$^2$ and a liquid absorption of 37%.

The treatment of the test paper was carried out on a laboratory size press from Mathis, Zürich, type HVF. The size liquor used was a solution of 8 parts by weight of dry oxidized potato starch (Perfectamyl P 255 SH from AVEBE) and 0.25-0.8 parts of the polymer dispersions A through D, made up to 100 parts with water. The size press operation temperature was about 60° C.

The surface-sized papers were dried on a drying cylinder for 1.5 minutes at about 115° C. Before the sizing test, the paper was conditioned for 2 hours at 23° C. and 50% r.h.

To assess the degree of sizing of the surface-sized papers, the Cobb values according to DIN 53122 were determined. The value is defined as the water absorption of a paper sheet in the course of a wetting time of 60 seconds, stated in g/m$^2$. The lower the Cobb value, the better is the degree of sizing of the treated papers.

The results are shown in Table 2.

TABLE 2

| | Dosage (wt % dry dispersion on dry paper) | | | | |
|---|---|---|---|---|---|
| | 0.03 | 0.050 | 0.06 | 0.070 | 0.08 |
| Cobb Form. A | 130.3 | 125.7 | 104.3 | 87.3 | 75.7 |
| Cobb Form. B | 129.3 | 117.0 | 109.0 | 100.3 | 99.3 |
| Cobb Form. C | 132.7 | 110.7 | 84.3 | 73.7 | 52.3 |
| Cobb Form. D | 99.7 | 41.7 | 29.7 | 25.7 | 24.0 |

EXAMPLE 3

Another series of tests were run in the same way as in Example 2 with formulations B, D, E and F on the same kind of paper. The results are shown in Table 3.

TABLE 3

| | Dosage % (wt % dry dispersion on dry paper) | | | | |
|---|---|---|---|---|---|
| | 0.03 | 0.050 | 0.06 | 0.070 | 0.08 |
| Cobb Form. B | 133.0 | — | 107.0 | — | 83.3 |
| Cobb Form. D | 102.3 | — | 33.0 | — | 22.7 |
| Cobb Form. E | 131.7 | 112.0 | 105.0 | 97.3 | 71.7 |
| Cobb Form. F | 115.3 | 73.7 | 41.7 | 34.3 | 31.0 |

EXAMPLE 4

Another series of tests were run in the same way as in Example 2 with formulations A through D but with 0.05-0.36 parts polymer dispersion in the size liquor and on fine paper (82% fiber and 18% GCC) internally pre-sized with AKD, having a basis weight of 80 g/m$^2$ and a liquid absorption of 61%. The results are shown in Table 4.

TABLE 4

| | Dosage (wt % dry dispersion on dry paper) | | | | |
|---|---|---|---|---|---|
| | 0.01 | 0.02 | 0.03 | 0.04 | 0.06 |
| Cobb Form. A | 34.8 | 31.1 | 26.6 | 26.5 | 25.1 |
| Cobb Form. B | 51.3 | 34.2 | 33.0 | 32.0 | 29.7 |

TABLE 4-continued

| | Dosage (wt % dry dispersion on dry paper) | | | | |
|---|---|---|---|---|---|
| | 0.01 | 0.02 | 0.03 | 0.04 | 0.06 |
| Cobb Form. C | 35.1 | 31.0 | 32.0 | 29.7 | 29.8 |
| Cobb Form. D | 35.7 | 31.2 | 32.2 | 29.0 | 24.7 |

EXAMPLE 4

Polymer dispersions G, H and J were prepared in the same way as in Example 1 but with the amounts of monomers and starch according to Table 5.

TABLE 5

| Formulation | Product composition |
|---|---|
| G (comparative) | 36% Styrene |
| | 14% n-Butylacrylate |
| | 14% t-Butylacrylate |
| | 36% Cationic starch (dry) |
| H (invention) | 36% Styrene |
| | 28% t-Butylacrylate |
| | 36% Cationic starch (dry) |
| I (invention) | 28% Styrene |
| | 36% t-Butylacrylate |
| | 36% Cationic starch (dry) |

EXAMPLE 5

Formulations G, H and I were tested in the same way as in Example 2 but on a paper being an unsized testliner grade from mixed waste having a basis weight of 110 g/m$^2$ and a liquid absorption of 42%. The results are shown in Table 6.

TABLE 6

| | Dosage (wt % dry dispersion on dry paper) | | | | | |
|---|---|---|---|---|---|---|
| | 0.02 | 0.03 | 0.04 | 0.05 | 0.06 | 0.07 |
| Cobb Form. G | — | 92.9 | 51.4 | 48.5 | 33.6 | 27.0 |
| Cobb Form. H | — | 70.0 | 37.4 | — | — | 24.2 |
| Cobb Form. I | 95.5 | 63.7 | 28.7 | 29.0 | 24.4 | 23.1 |

The invention claimed is:

1. An aqueous starch-containing polymer dispersion suitable for surface treatment of paper made fully or partially of recycled paper, said dispersion obtained by co-polymerization of ethylenically unsaturated monomers consisting of:
    (a) from 20 to 50 wt % of at least one of styrene or substituted styrene;
    (b) from 20 to 60 wt % t-butyl acrylate; and
    (c) from 0 to 20 wt % of at least one ethylenically unsaturated co-polymerisable monomer being different from (a) and (b), in the presence of
    (d) from 10 to 50 wt % cationic starch having a degree of substitution (DS) from 0.005 to 0.5, wherein the sum of (a)+(b)+(c)+(d) is 100% and wherein ratio of: monomer (c): t-butyl acrylate (b) is between 0:1 to 0.1:1.

2. The polymer dispersion as claimed in claim 1 obtained by copolymerization of monomers consisting:
    (a) from 25 to 45 wt % styrene;
    (b) from 24 to 40 wt % t-butyl acrylate; and
    (c) from 0 to 10 wt % of at least one ethylenically unsaturated co-polymerisable monomer being different from (a) and (b), in the presence of (e) from 15 to 45 wt % cationic starch having a degree of substitution (DS) from 0.005 to 0.5, wherein the sum of (a)+(b)+(c)+(d) is 100%, and wherein ratio of monomer (c): t-butyl acrylate (b) is between 0:1 to 0.1:1.

3. The polymer dispersion as claimed in claim 2 obtained by copolymerization of monomers consisting:
   (a) from 29 to 41 wt % styrene;
   (b) from 24 to 38 wt % t-butyl acrylate; and
   (c) from 0 to 10 wt % of at least one ethylenically unsaturated co-polymerisable monomer being different from (a) and (b), in the presence of
   (f) from 20 to 40 wt % cationic starch, having a degree of substitution (DS) from 0.005 to 0.5, wherein the sum of (a)+(b)+(c)+(d) is 100%, and wherein ratio of monomer (c) t-butyl acrylate (b) is between 0:1 to 0.1:1.

4. The polymer dispersion as claimed in claim 1, wherein monomer (c), if present, is at least one ester of (meth)acrylic acid derived from monohydric C1 to C22 alcohols.

5. The polymer dispersion as claimed in claim 1, wherein the dry content of the polymer dispersion is from 5 to 50%.

6. The polymer dispersion as claimed in claim 1, wherein the cationic starch has a weight average molecular weight Mw from 1000 to 65000.

7. The polymer dispersion as claimed in claim 6, wherein the cationic starch has a weight average molecular weight Mw from 11000 to 35000.

8. A process for the preparation of an aqueous starch-containing polymer dispersion according to claim 1, comprising polymerizing ethylenically unsaturated monomers consisting of:
   a) from 20 to 50 wt % of at least one of styrene or substituted styrene;
   b) from 20 to 60% t-butyl acrylate; and
   c) from 0 of 20 wt % of at least one ethylenically unsaturated co-polymerisable monomer being different from (a) and (b), in the presence of
   d) from 10 to 50 wt % starch, wherein the sum of (a)+(b)+(c)+(d) is 100%, and wherein ratio of:monomer (c) t-butyl acrylate (b) is between 0:1 to 0.1:1.

9. A process for surface sizing of paper comprising applying a polymer dispersion according to claim 1 to at least one surface of paper, wherein the paper is fully or partly based on recycled paper.

10. A process for the production of paper comprising the steps of forming a paper web from a stock containing cellulosic fibers and applying to at least one surface of the paper web an aqueous dispersion according to claim 1.

11. The process as claimed in claim 9, wherein the paper is any one of liner, liner board, container board, testliner, recycled liner or white top liner having of a back layer made from recycled fibers.

12. The polymer dispersion according to claim 3, wherein the degree of substitution (DS) of the cationic starch is from 0.005 to 0.5 and the cationic starch has a weight average molecular weight Mw from 11000 to 35000.

* * * * *